United States Patent [19]

Kurihara

[11] Patent Number: 5,956,480

[45] Date of Patent: *Sep. 21, 1999

[54] TERMINAL AND ONLINE SYSTEM FOR TRACKING VERSION OF DATA AND PROGRAM

[75] Inventor: Yasushi Kurihara, Kawasaki, Japan

[73] Assignee: Fujitsu Limited, Kanagawa, Japan

[ * ] Notice: This patent is subject to a terminal disclaimer.

[21] Appl. No.: 08/292,033

[22] Filed: Aug. 18, 1994

[30] Foreign Application Priority Data

Nov. 19, 1993 [JP] Japan ................................ 5-290706

[51] Int. Cl.$^6$ ........................... G06F 11/10; G06F 11/08
[52] U.S. Cl. ...................... 395/185.05; 371/67.1
[58] Field of Search ..................... 395/575; 371/68.1, 371/68.3

[56] References Cited

PUBLICATIONS

Hathaway, Overcoming Network Bottlenecks, UNIX Review, Apr. 1990, at 63.

*Primary Examiner*—Robert W. Beausoliel, Jr.
*Assistant Examiner*—Alan M. Fisch
*Attorney, Agent, or Firm*—Staas & Halsey

[57] ABSTRACT

A terminal device for carrying out online processing with a host computer by using information stored in a memory includes a store control unit which receives the information and version information regarding the information from the host computer and stores, in the memory, the information with two copies of the version information attached at the beginning and the end of the information, respectively. The terminal device further includes a check unit which reads and compares the two copies of the version information stored in the memory, and an online processing unit which starts the online processing based on the information stored in the memory if the two copies of the version information are identical. In addition, the terminal device further includes a display unit which displays a message indicating an abnormality of the information if the two copies of the version information are contradictory (not identical).

8 Claims, 16 Drawing Sheets

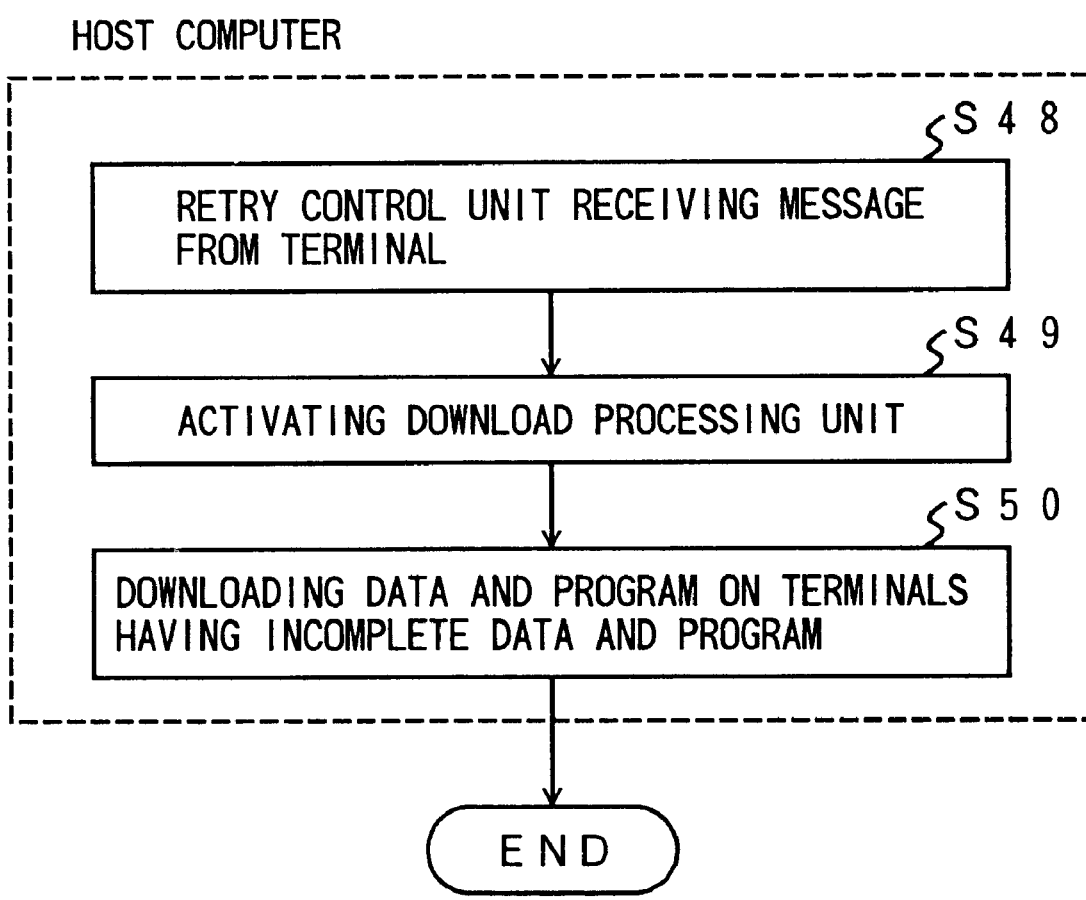

TERMINAL AND ONLINE SYSTEM FOR TRACKING VERSION OF DATA AND PROGRAM

BACKGROUND OF THE INVENTION

1. Field of the Invention

The present invention generally relates to terminals and online systems, and more particularly relates to terminals and an online system which carry out online processing by using data and programs stored in an erasable memory media like a flash memory.

In recent years, the EEPROM, which is a type of erasable ROMs, has seen significant advances in its degree of circuit integration. Now, EEPROMs having as large a memory volume as conventional ROMs are commercially available, known as flash memories.

Flash memories are electrically erasable and capable of rewrite, so that an application of flash memories ranges in a wide variety of fields. Among them, the field of online systems like a totalizator system is expected to be a promising application area, where flash memories can be used as a memory storage of control programs in terminals.

2. Description of the Prior Art

FIG. 1 shows an exemplary block diagram of a totalizator system of the prior art. In FIG. 1, a terminal of the prior art comprises a ROM 201 for storing programs for an initialization process and an EPROM 202 with a large memory volume. The terminal further comprises a communication control unit 203 for controlling communications with a host computer. The communication control unit 203, the ROM 201, the EPROM 202, and the CPU 204 are connected together via a bus.

The CPU 204 carries out the initialization process upon the switching on of the power. Then, the CPU 204 executes programs for online processing to have a data communication with the host computer by controlling the communication control unit 203 in accordance with instructions given by a user through an I/O (Input/Output) device. In FIG. 1, the I/O device, its control unit, etc., are all omitted.

As is well known, in order to rewrite contents of EPROMs, a ROM writer or a similar special device is needed.

Accordingly, when rewriting programs for online processing in a terminal, a board on which an EPROM is mounted should be removed from the terminal to be shipped to the manufacturer's factory. Then, the EPROM is disconnected from the board so that new programs can be rewritten with a ROM writer, and, then, is mounted again on the board.

In other words, the updating and the version tracking of data and programs of online terminals are all carried out by maintenance workers of the manufacturers.

Thus, version information about data and programs is provided on the board, for example, by a seal or a stamp, and maintenance workers carry out each maintenance on the basis of the information provided. Even in the cases that version information is contained in the memory with data and programs, its role is no more than that of a seal or a stamp, and is not involved in sophisticated data processing.

The updating process of data and programs described above is not a simple task. Since many terminals are connected to an online system, many work steps and a great amount of time are required for the updating process. This means a significant amount of work load on the maintenance workers.

If EEPROMs, whose memory contents can be electrically rewritten, are used in terminals, it is possible to rewrite data and programs from a remote host computer, thereby reducing the work load on the maintenance workers.

The lack of enough memory volume in EEPROMs of the prior art requires the use of a number of EEPROMs, which leads to an increase in the size of the terminals. Thus, EEPROMs of the prior art are not used in such fields as totalizator systems which demand a miniaturization of terminals.

The recent technological development of flash memories described earlier, however, makes it possible to replace EPROMs with flash memories without increasing the size of terminals. This means that programs for online processing can now be downloaded from a host computer.

However, the downloading of data and programs from a host computer, if carried out in a straightforward way, may create a new problem.

For example, if a process of downloading is terminated due to a power failure or a software malfunction, a process of rewriting flash memories is also terminated. In this case, a terminal, starting up after the recovery, ends up executing incorrect programs which have been only stored in part.

In order to prevent this, such online systems as mobile telephone systems keep old data and programs of the previous version as an insurance, and use new data and programs only after checking their completeness.

Keeping old data and programs, however, requires a huge amount of memory volume. Thus, it is difficult to employ the method in the fields which demand a miniaturization of terminals.

Accordingly, there is a need in the field of online systems for terminals and an online system which can check the completeness of new data and program downloaded from the host computer and can take a counter measure if necessary.

SUMMARY OF THE INVENTION

Accordingly, it is a general object of the present invention to provide terminals and an online system which satisfy the need described above.

It is another and more specific object of the present invention to provide terminals and an online system which can check the correctness of data and programs and can take a counter measure, if necessary, with a simple mechanism.

In order to achieve the above objects, according to the present invention, a terminal device for carrying out online processing with a host computer by using information stored in a memory comprises a store control unit for receiving the information and version information regarding the information from the host computer and for storing in the memory the information with two copies of the version information attached at the beginning and the end of the information, a check unit for reading and comparing the two copies of the version information stored in the memory, an online processing unit for starting the online processing based on the information stored in the memory if the two copies of the version information are identical, and a display unit for displaying a message indicating an abnormality of the information if the two copies of the version information are contradictory.

Thus, the terminal device itself can check the validity of the information. Since the online processing unit starts its operation according to the result of the check, the execution of incomplete programs can be prevented in the case that the downloading of the information is terminated incompletely. Also, the result of the check displayed on the display unit can provide users of the terminal device with information regarding the validity of the information.

The above objects can also be achieved by the following configuration. An online system with at least one terminal device for carrying out online processing with a host computer by using information stored in a memory comprises a store control unit for receiving the information and version information regarding the information from the host computer and for storing in the memory the information with two copies of the version information attached at the beginning and the end of the information, a check unit for reading and comparing the two copies of the version information stored in the memory, an online processing unit for starting the online processing based on the information stored in the memory if the two copies of the version information are identical, an abnormality notifying unit for sending to the host computer a message indicating an abnormality of the information if the two copies of the version information are contradictory, wherein the store control unit, the check unit, the online processing unit, and the abnormality notifying unit are all included in at least one terminal device, and a download unit for sending the information to at least one terminal device in response to the message, the download unit being included in the host computer.

In this configuration, the host computer carries out the downloading of the information by means of the download unit in response to a message sent from the terminal device. Since automatic downloading is activated when there is an abnormality in the information, the work load on the people in the operation center can be reduced.

Other objects and further features of the present invention will be apparent from the following detailed description when read in conjunction with the accompanying drawings.

BRIEF DESCRIPTION OF THE DRAWINGS

FIGS. 10A and 10B are respectively a block diagram of terminals and an online system and a flow chart of a host computer according to the third embodiment of the present invention;

DESCRIPTION OF THE PREFERRED EMBODIMENTS

First, a brief description will be given of the embodiments of the present invention with reference to FIGS. 2 to 4.

Figure 2:
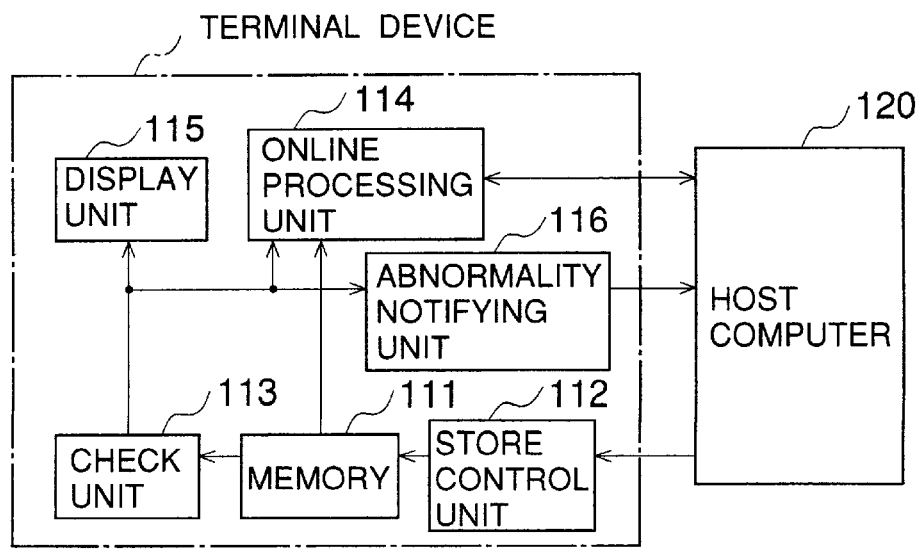
FIG. 2 is a block diagram of a configuration of a terminal device according to first and second embodiments of the present invention.

FIG. 2 shows a block diagram of a configuration of a terminal device according to first and second embodiments of the present invention.

According to the first embodiment, the terminal device for carrying out online processing with a host computer 120 by using data and operation programs stored in a memory 111 comprises a store control unit 112 for receiving the data, the operation programs, and version information regarding the data and the operation programs from the host computer 120 and for storing in the memory 111 the data and the operation programs with two copies of the version information attached at the beginning and the end of the data and the operation programs. The terminal device further comprises a check unit 113 for reading and comparing the two copies of the version information stored in the memory 111 and an online processing unit 114 for starting the online processing based on the data and the operation programs stored in the memory 111 if the two copies of the version information are identical. The terminal device further comprises a display unit 115 for displaying a message indicating an abnormality of the data and the operation programs if the two copies of the version information are contradictory.

In the first embodiment, the store control unit 112 attaches two copies of version information at the beginning and the end of the data and the operation programs, and the check unit 113 compares the two copies of version information so that the terminal device on its own can check the validity of the data and the operation programs. Since the online processing unit 114 starts its operation according to the result of the check, the execution of incomplete programs is prevented in the case that the downloading of the data and the operation programs is terminated incompletely. Also, the result of the check displayed on the display unit 115 can provide users of the terminal device with information regarding the validity of the data and the operation programs.

According to the second embodiment, the terminal device for carrying out online processing with a host computer 120 by using data and operation programs stored in a memory 111 comprises a store control unit 112 for receiving the data, the operation programs, and version information regarding the data and the operation programs from the host computer 120 and for storing in the memory 111 the data and the operation programs with two copies of the version information attached at the beginning and the end of the data and the operation programs. The terminal device further comprises a check unit 113 for reading and comparing the two copies of the version information stored in the memory 111 and an online processing unit 114 for starting the online processing based on the data and the operation programs stored in the memory 111 if the two copies of the version information are identical. The terminal device further comprises an abnormality notifying unit 116 for sending to the host computer 120 a message indicating an abnormality of the data and the operation programs if the two copies of the version information are contradictory.

In the second embodiment, the abnormality notifying unit 116 notifies the host computer 120 of the abnormality of the data and the operation programs. Since information regarding the abnormality is sent automatically to the host computer 120, people in the operation center can take a counter measure immediately based on the information provided.

Figure 3:
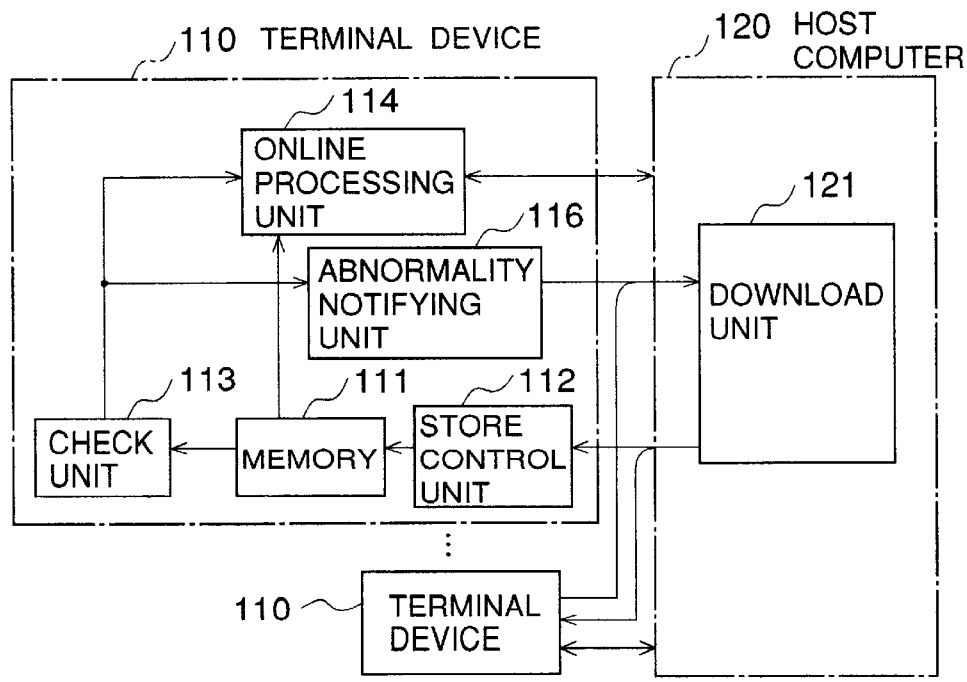
FIG. 3 is a block diagram of a configuration of an online system according to a third embodiment of the present invention.

FIG. 3 shows a block diagram of a configuration of an online system according to a third embodiment of the present invention.

According to the third embodiment, the online system with at least one terminal device 110 for carrying out online processing with a host computer 120 by using data and operation programs stored in a memory 111 comprises a store control unit 112 for receiving the data, the operation programs, and version information regarding the data and the operation programs from the host computer 120 and for storing in the memory 111 the data and the operation programs with two copies of the version information attached at the beginning and the end of the data and the operation programs. The online system further comprises a check unit 113 for reading and comparing the two copies of the version information stored in the memory 111 and an online processing unit 114 for starting the online processing based on the data and the operation programs stored in the memory 111 if the two copies of the version information are identical. The online system further comprises an abnormality notifying unit 116 for sending to the host computer 120 a message indicating an abnormality of the data and the operation programs if the two copies of the version information are contradictory. Here, the store control unit 112, the check unit 113, the online processing unit 114, and the abnormality notifying unit 116 are all included in at least one terminal device 110. The online system further comprises a download unit 121 for sending the data and the operation programs to at least one terminal device 110 in response to the message, which download unit 121 is included in the host computer 120.

In the third embodiment, the host computer 120 carries out the downloading of the data and the operation programs by means of the download unit 121 in response to a message sent from the terminal device 110. Since automatic downloading is activated when there is an abnormality in the data and the operation programs, the work load on the people in the operation center can be reduced.

Figure 4:
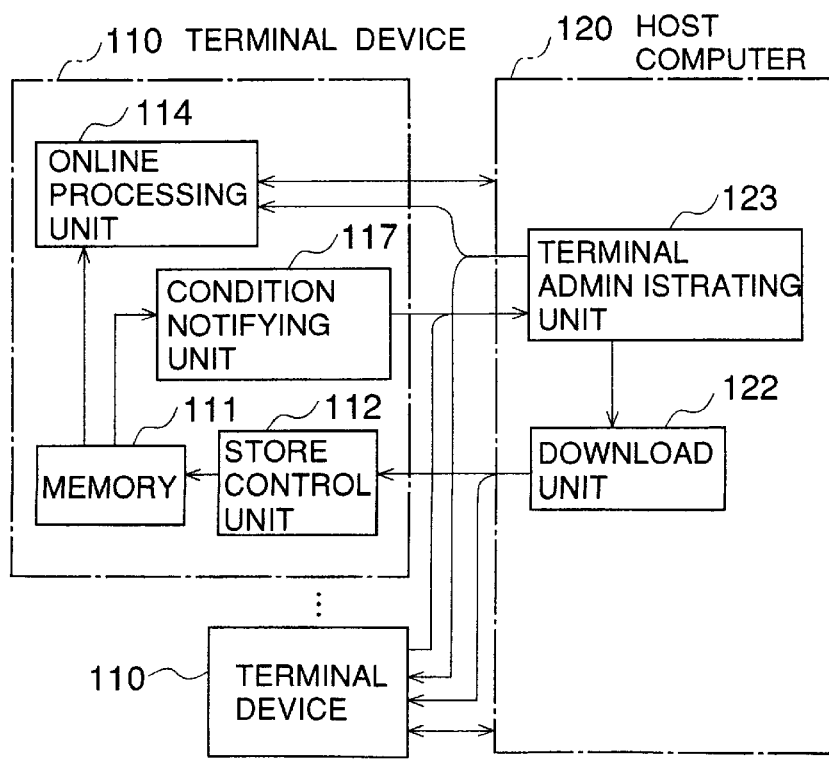
FIG. 4 is a block diagram of a configuration of an online system according to a fourth embodiment of the present invention.

FIG. 4 shows a block diagram of a configuration of an online system according to a fourth embodiment of the present invention.

According to the fourth embodiment, the online system with at least one terminal device 110 for carrying out online processing with a host computer 120 by using data and operation programs stored in a memory 111 comprises a store control unit 112 for receiving the data, the operation programs, and version information regarding the data and the operation programs from the host computer 120 and for storing in the memory 111 the data and the operation programs with two copies of the version information attached at the beginning and the end of the data and the operation programs. The online system further comprises a condition notifying unit 117 for generating condition information based on the two copies of the version information stored in the memory 111 and for sending the condition information to the host computer 120, and an online processing unit 114 for starting the online processing based on the data and the operation programs stored in the memory 111 in response to a start instruction. Here, the store control unit 112, the condition notifying unit 117, and the online processing unit 114 are all included in at least one terminal device 110. The online system further comprises a download unit 122 for sending the data and the operation programs to some of at least one terminal device 110 according to a download instruction, and a terminal administrating unit 123 for generating the download instruction and the start instruction by using the condition information. Here, the terminal administrating unit 123 and the download unit 122 are included in the host computer 120.

In the fourth embodiment, the condition notifying unit 117 of each of the terminal devices 110 generates information regarding its own condition, and sends it to the host computer 120. The terminal administrating unit 123 of the host computer 120 centrally administers each of the terminal devices 110. The terminal administrating unit 123 activates the online processing unit 114 for the terminal devices 110 whose data and operation programs are valid according to the condition information. Also, the terminal administrating unit 123 activates the download unit 122 for the terminal devices 110 whose data and operation program are abnormal according to the condition information.

In the following, those embodiments of the present invention will be described in detail.

Figure 5:
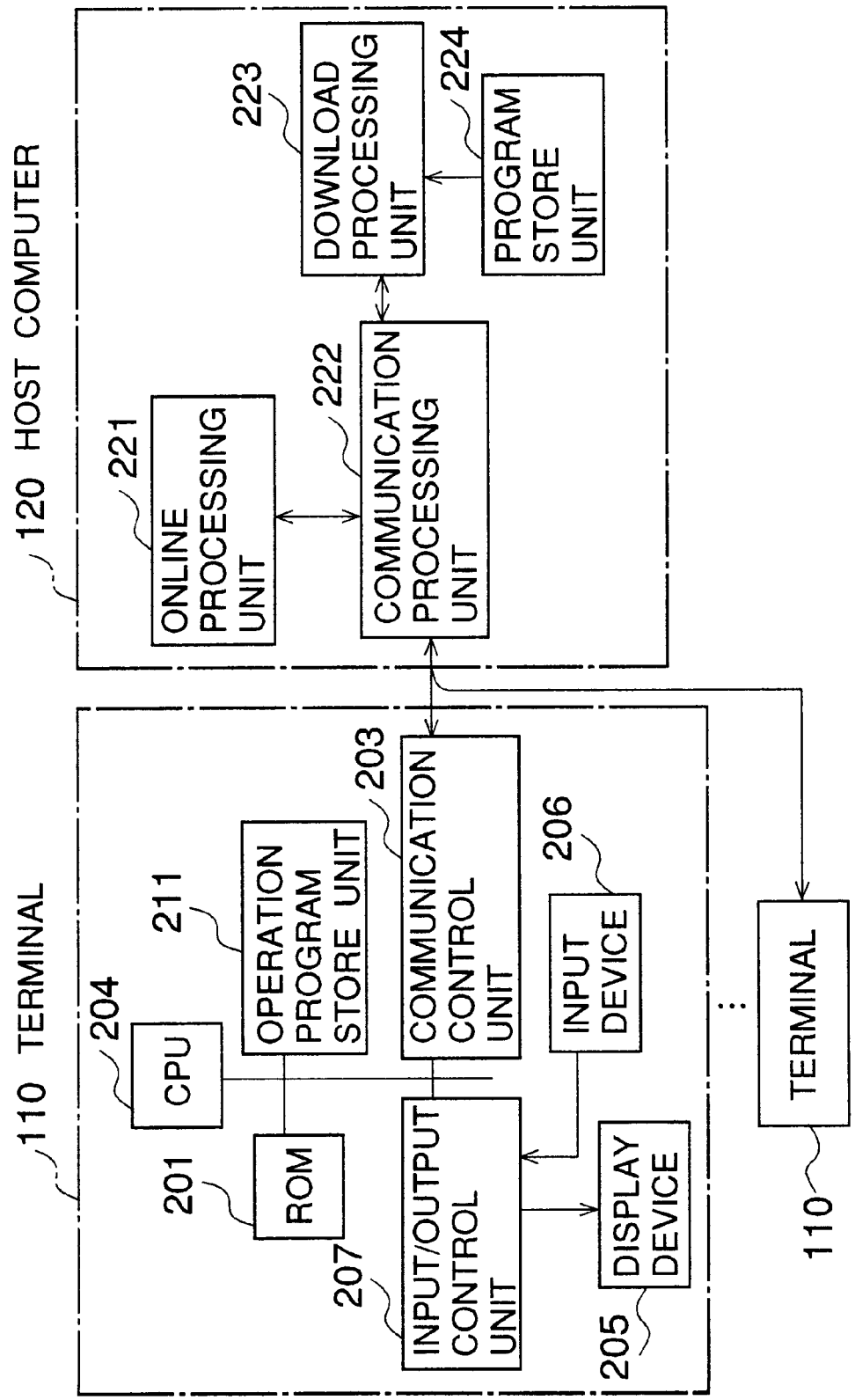
FIG. 5 is a block diagram of terminals and an online system according to the first embodiment of the present invention.

FIG. 5 shows a block diagram of terminals and an online system according to the first embodiment of the present invention.

Figure 1:
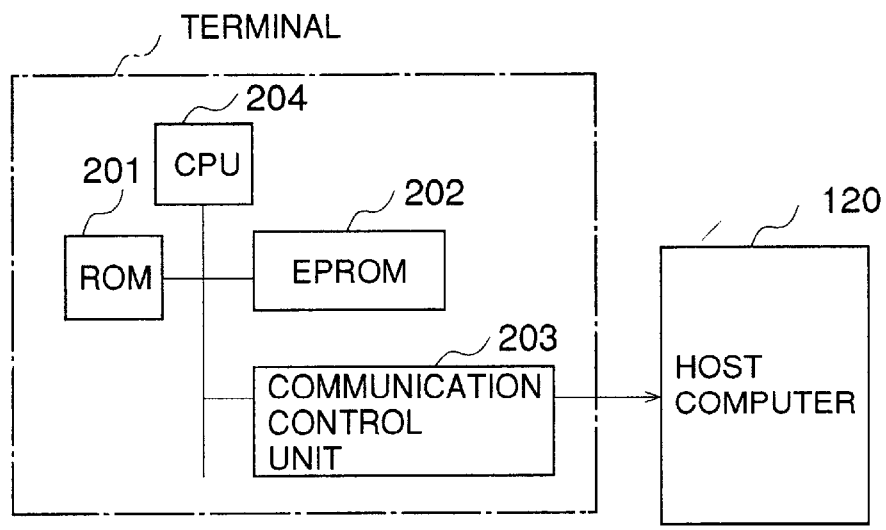
FIG. 1 is a block diagram of a terminal of the prior art.

In FIG. 5, each of terminals 110 is comprised of an operation program store unit 211 replacing the EPROM 202 of the prior art of FIG. 1. The operation program store unit 211 is equivalent to the memory 111, and comprises a plurality of flash memories.

A display device 205 and an input device 206 such as a keyboard are connected to a CPU 204 via an input/output control unit 207 and a bus. The CPU 204 controls the display device 205 and the input device 206 via the input/output control unit 207.

In FIG. 5, a host computer 120 comprises an online processing unit 221 for carrying out normal online processing, a communication processing unit 222, a download processing unit 223, and a program store unit 224.

The download processing unit 223 gives instructions of downloading to each of the terminals 110 connected thereto in response to a download command for updating data and operation programs of the terminals 110. Then, after waiting for a response from the terminals 110, data and programs stored in the program store unit 224 are sent out to communication lines via the communication processing unit 222.

In FIG. 5, the ROM 201 of each of the terminals 110 contains data and programs for an initialization process as well as programs for carrying out a download process in response to an instruction given by the host computer. Also, the ROM 201 contains programs for version check processing and error handling.

Figure 6A:
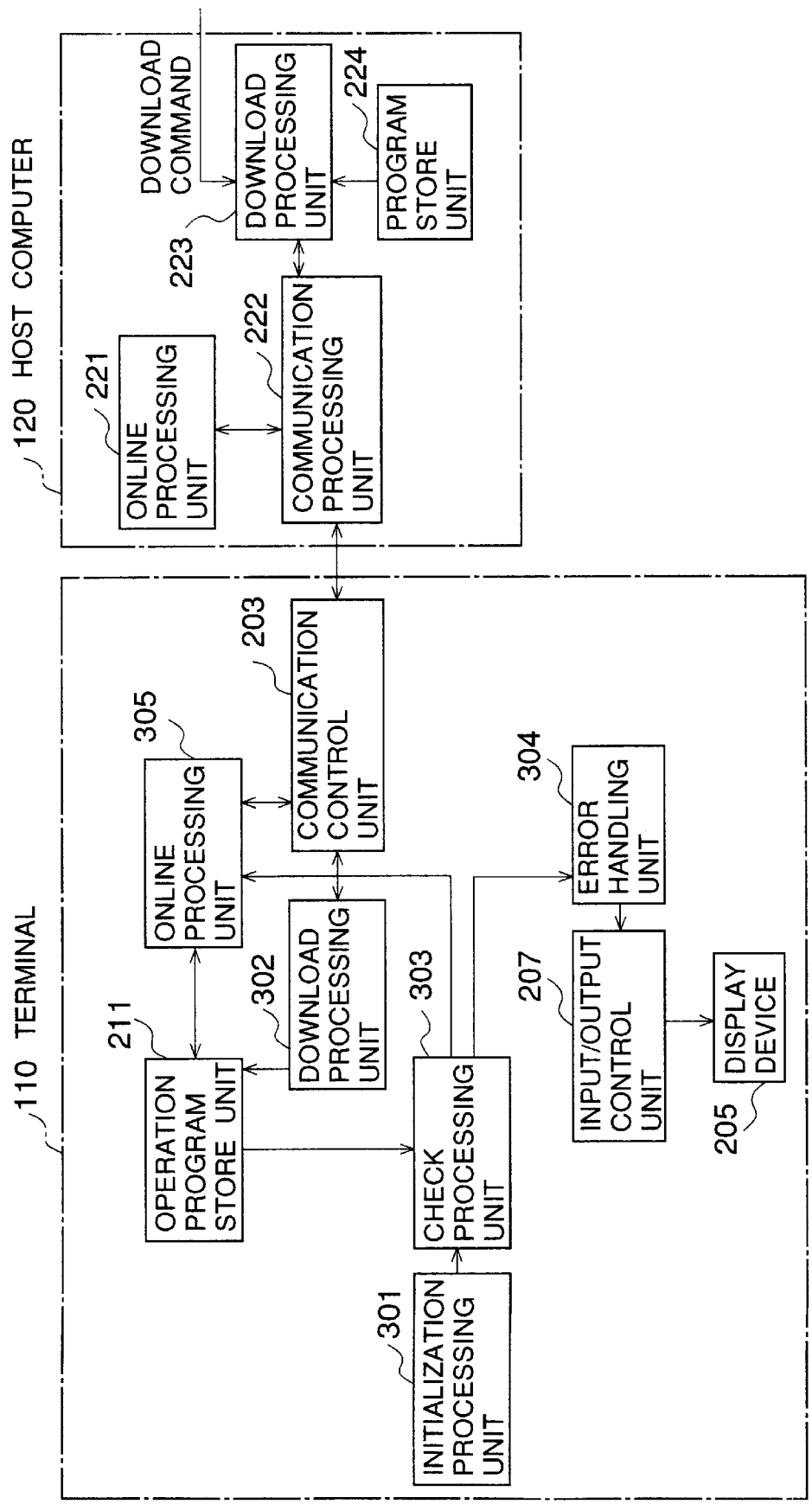
FIGS. 6B, 6C are respectively a block diagram showing functions of the terminals and the online system, a flow chart of downloading, and a flow chart of a process of the terminals according to the first embodiment of the present invention.
Figure 6B:
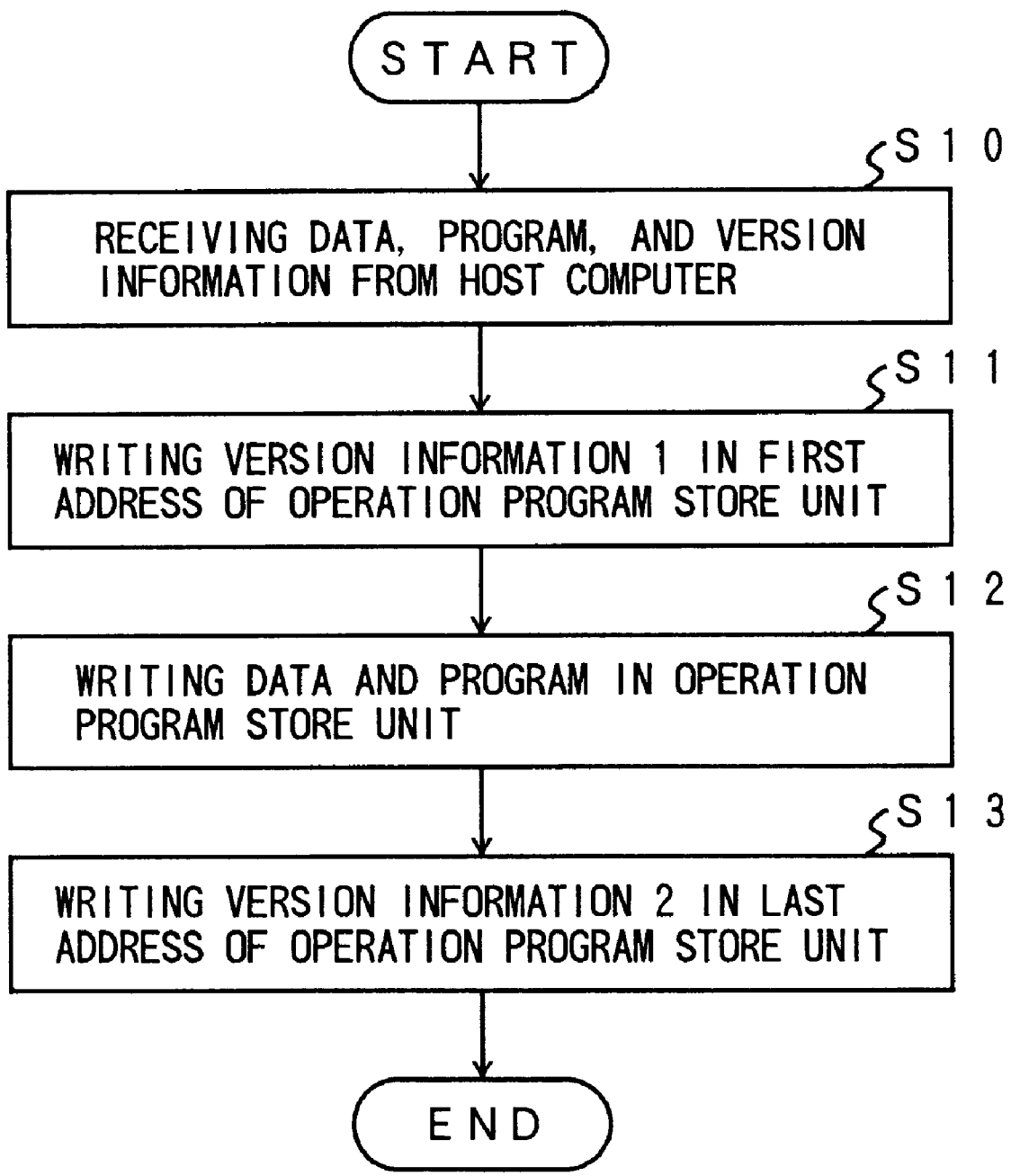
Figure 6C:
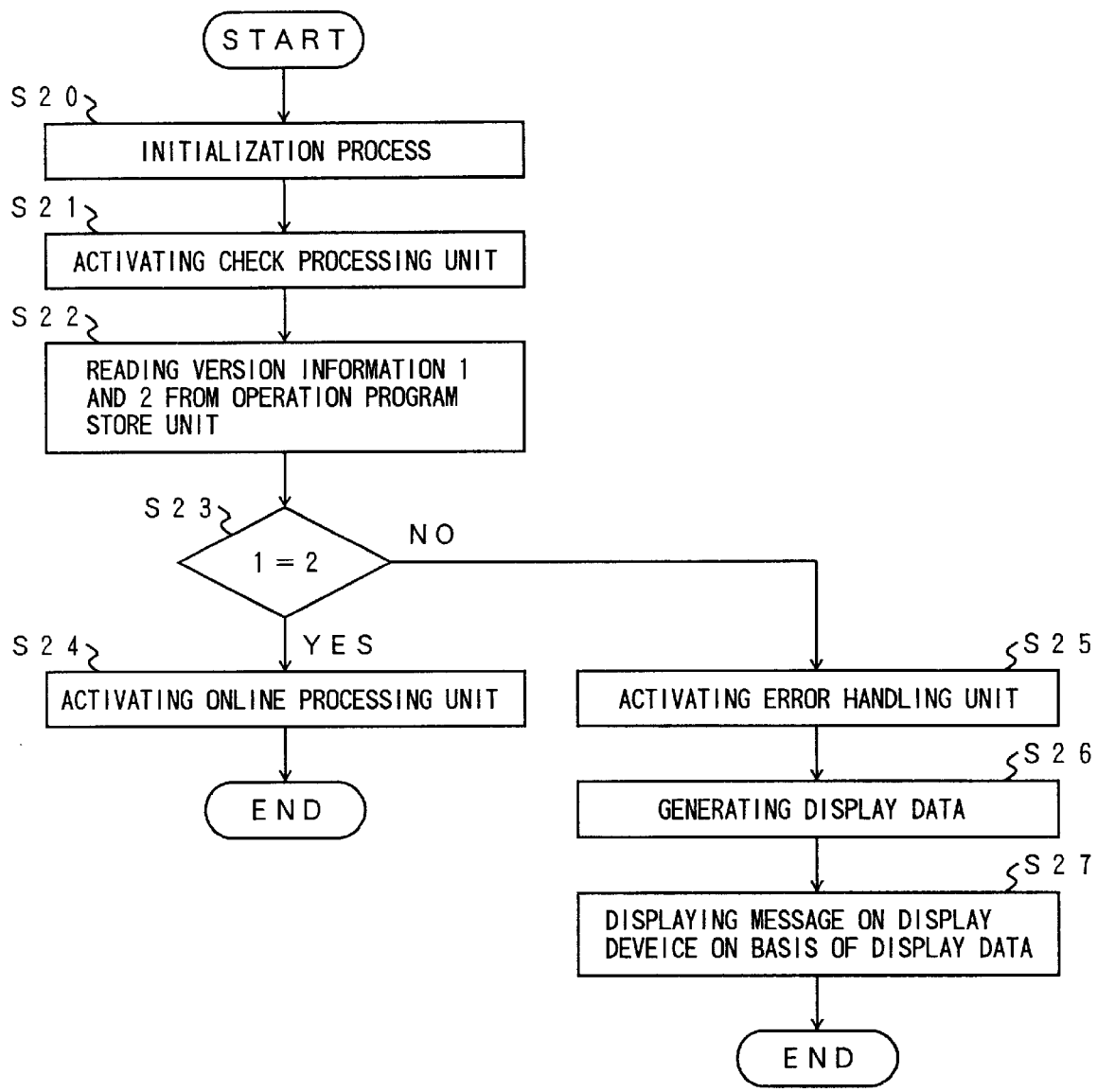

FIG. 6A shows a block diagram for explaining functions of the terminals and the online system according to the first embodiment of the present invention. FIGS. 6B and 6C show a flow chart of downloading on the terminals and a flow chart of a process of the terminals, respectively.

In FIG. 6A, each of an initialization processing unit 301, a download processing unit 302, a check processing unit 303, and an error handling unit 304 has a corresponding function which is carried out by an execution of a set of programs by the CPU 204.

In the following, the operation of the first embodiment of the present invention will be explained with reference to FIGS. 6A, 6B, and 6C.

Upon receiving an instruction of downloading new data and programs from the host computer via the data communication control unit 203, the download processing unit 302 starts its operation.

The download processing unit 302 is equivalent to the store control unit 112, and rewrites the contents of the operation program store unit 211 upon receiving data, programs, and version information (e.g., Xth version) from the host computer at a step S10 of FIG. 6B. In doing so, the download processing unit 302 writes the version information as a version information 1 in the first address of the operation program store unit 211 at a step S11. Then, at a step S12, new data and programs are written into the following addresses. After completing the writing of all the data and programs, the download processing unit 302 writes the version information as a version information 2 in the last address of the operation program store unit 211 at a step S13. This is the end of the download process.

Figure 7A:
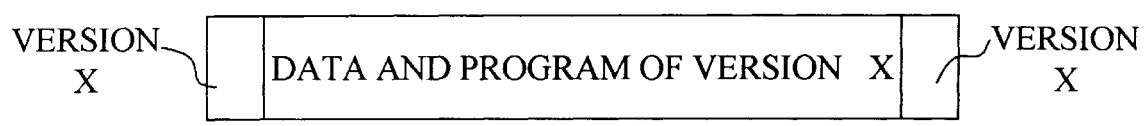
FIGS. 7A and 7B are illustrative drawings showing version information.

Thus, when the download process is completed without any aberration, the operation program store unit 211 has the version information 1 and 2, both indicating the same version X, at the beginning and the end of addresses, as shown in FIG. 7A. The data and programs of version X are stored between them.

Figure 7B:
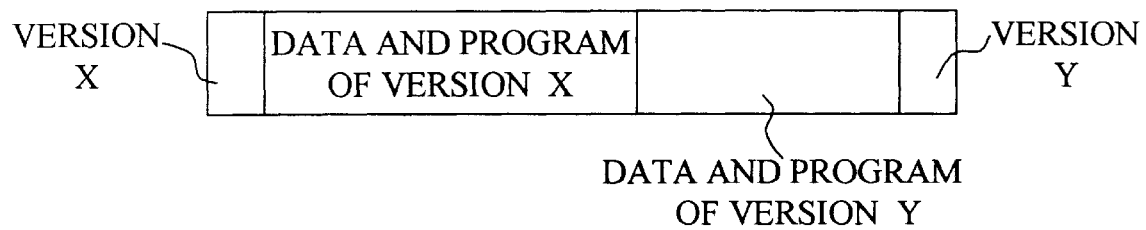

Thus, when the download process is terminated on the way, the operation program store unit 211 has the version information 1 and 2, indicating different versions X and Y, at the beginning and the end of addresses, respectively, as shown in FIG. 7B. Incomplete data and programs of version X and Y are stored between them.

By comparing the two pieces of the version information 1 and 2, a check can be made whether the data and programs are valid or not.

In FIGS. 6A and 6C, upon the switching on of the power, the initialization processing unit 301 carries out a initialization process at a step S20. After the completion of the process, the check processing unit 303 is enacted at a step S21.

The check processing unit 303 is equivalent to the check unit 113. At a step S22, the check processing unit 303 reads the version information 1 and 2 from the first and last addresses of the operation program store unit 211, respectively, and, then, activates either the error handling unit 304 or the online processing unit 305 depending on the result of the comparison of the two pieces of the version information.

When the two pieces of the version information are the same, the check processing unit 303 concludes that the data and the programs in the operation program store unit 211 are valid, and activates the online processing unit 305 at a step S24.

As described above, the version information attached at the beginning and the end of data and programs make it possible with a simple mechanism to check the correctness of the data and the programs stored in the operation program store unit 211. Also, the online processing unit 305 is activated only when the result of the check indicates the correctness of the data and the programs. This prevents the terminals from executing programs rendered incomplete due to the termination of download.

Thereby, the download of operation programs can be implemented even in an online system which requires a small size of terminals. This leads to a decrease in work load on the maintenance workers.

When the two pieces of the version information are contradictory, the check processing unit 303 concludes that the data and the programs are incomplete, and activates the error handling unit 304 at a step S25. At a step S26, the error handling unit 304 generates display data for showing a message that there is an abnormality in the data and the programs. Then, the error handling unit 304 sends this display data to the display device 205 via the input/output control unit 207 so as to display a message on the display device 205 at a step S27.

That is, the error handling unit 304, the display device 205, and the input/output control unit 207 realize the functions of the display unit 115, and provide users with information regarding the abnormality of the data and the programs.

The message displayed on the display device 205 provides the users with accurate information as mentioned above. This enables the people in the operation center to get the information by telephone, for example, and to react to the situation with a proper counter measure.

Here, it is possible to have data and programs in the program store unit 224 of the host computer 120 with the version information attached at the beginning and the end thereof. The download processing unit 223 can send those contents of the program store unit 224 to the terminals 110 via the communication processing unit 222.

In this case, part of the functions of the store control unit 112 is implemented by the program store unit 224. Thus, the download processing unit 302 of each of the terminals 110 can store in the operation program store unit 211 information received via the communication control unit 203 without processing it.

Alternately, as in the following, the terminals may notify the host computer of the abnormality of data and programs when they detect it.

Figure 8:
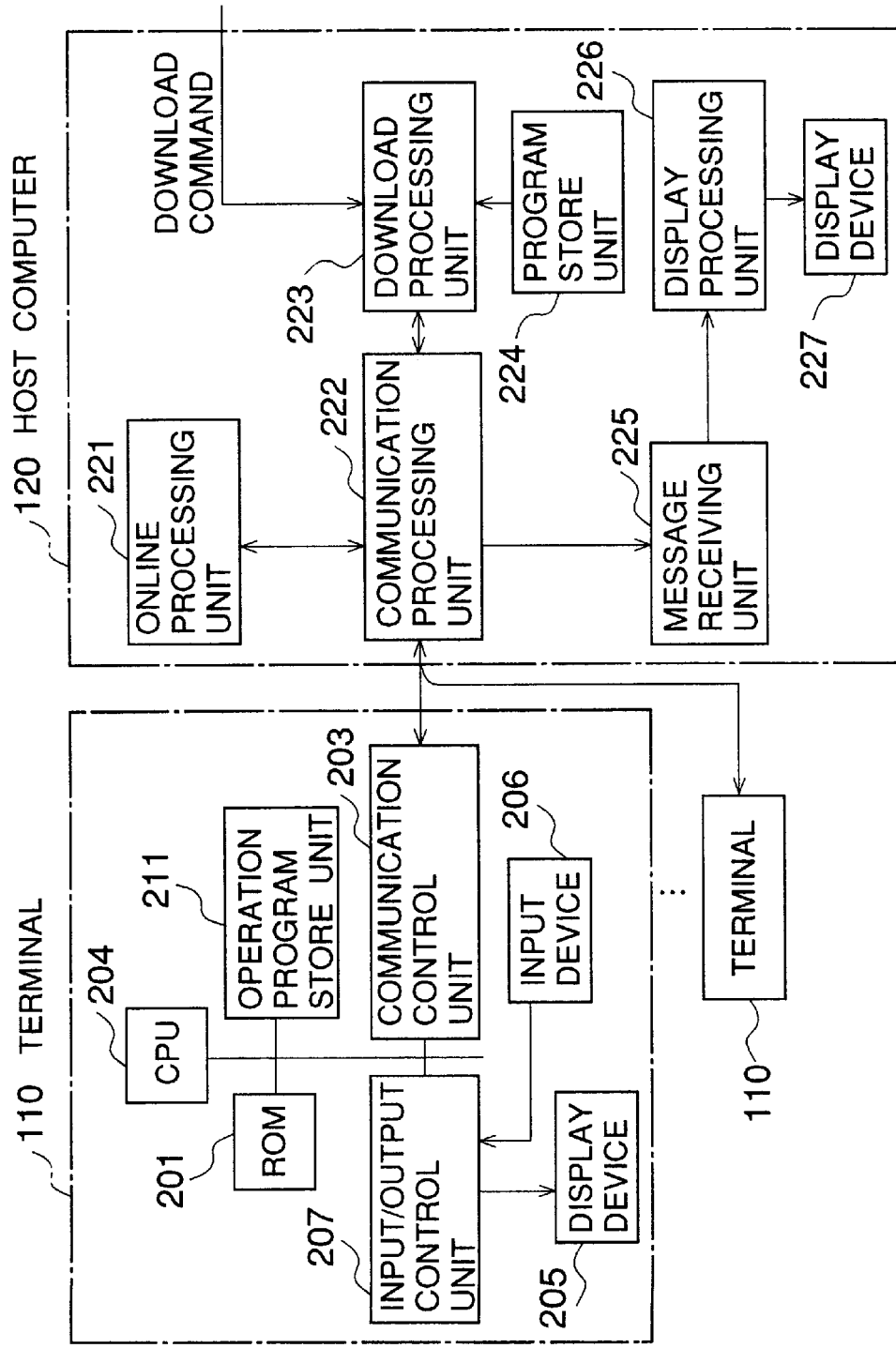
FIG. 8 is a block diagram of terminals and an online system according to the second embodiment of the present invention.

FIG. 8 shows a block diagram of terminals and an online system according to the second embodiment of the present invention.

In FIG. 8, the online system provided with the terminals of the second embodiment differs from the online system of FIG. 5 in an additional message receiving unit 225 of the host computer 120.

The message receiving unit 225 sends to a display processing unit 226 of the host computer 120 a message indicating the abnormality of data and programs.

The display processing unit 226 generates display data based on the message received via the message receiving unit 225, and, then, sends the message to a display device 227 of the host computer 120. Thereby information with regard to the message can be displayed.

In this case, error handling programs stored in the ROM 201 of each of the terminals 110 are programs which generate a message regarding the abnormality of data and programs and send it to the host computer via the communication control unit 203.

Figure 9A:
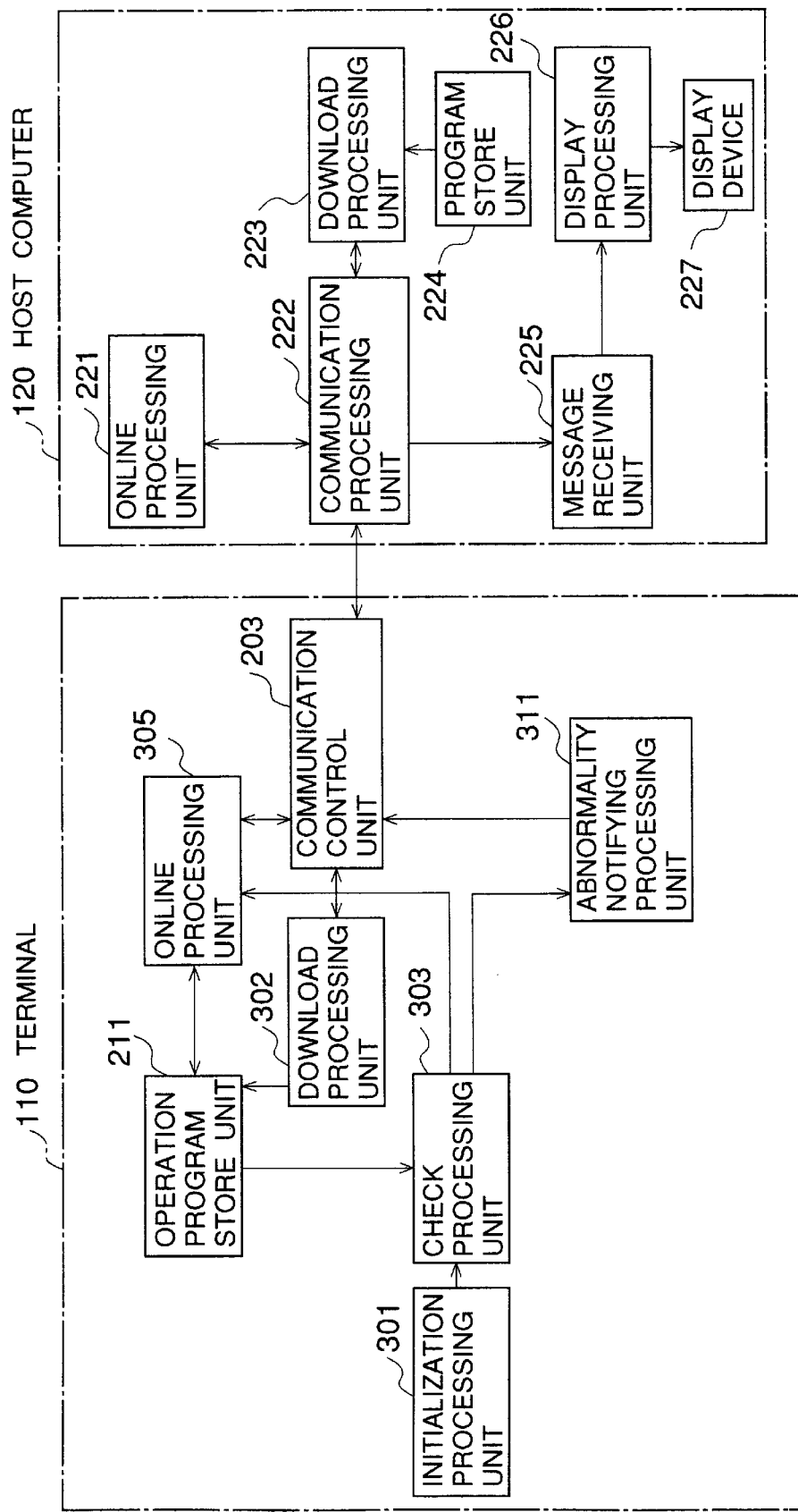
FIGS. 9A and 9B are respectively a block diagram showing functions of the terminals and the online system and a flow chart of them according to the second embodiment of the present invention.
Figure 9B:
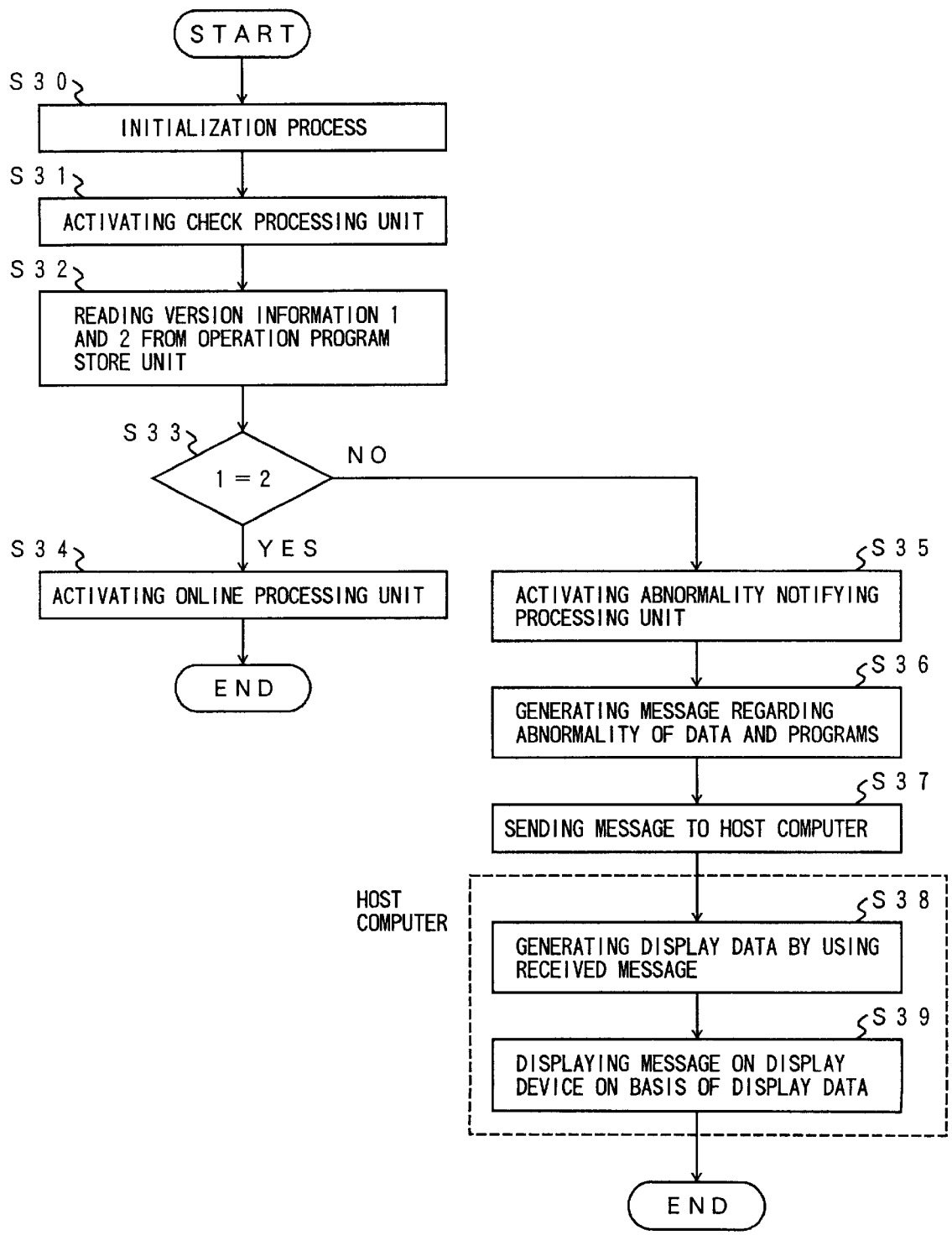

FIG. 9A shows a block diagram for explaining functions of the terminals and the online system according to the second embodiment of the present invention. FIG. 9B shows a flow chart of a process of the terminals and the host computer.

In FIG. 9A, elements which perform the same function as those of FIG. 6A are referred to by the same numerals. Also, in FIG. 9A, an abnormality notifying processing unit 311 represents a function which is carried out by error handling programs executed by the CPU 204 to send a message to the host computer.

In FIG. 9B, steps up to a step S34 are the same as the steps S20 through S24 of FIG. 6C so that only part of FIG. 9B, i.e., after the step S34, will be explained below.

Depending on the result of check by the check processing unit 303, the abnormality notifying processing unit 311 is activated at a step S35, and generates a message regarding the abnormality of data and programs at a step S36, and sends the message at a step S37 to the host computer 120 via the communication control unit 203. That is, the abnormality notifying processing unit 311 and the communication control unit 203 together perform the function of the abnormality notifying unit 116. The abnormality notifying processing unit 311 may generate a message, for example, indicating that the download was incomplete, and the message is sent to the host computer 120.

This message is received by the message receiving unit 225 of the host computer 120, and, then, sent to the display processing unit 226. At a step S38, the display processing unit 226 generates display data regarding this message, which display data is sent to the display device 227.

The message receiving unit 225 may detect the identification of the terminal 110 from which it received the message, and this identification can be sent to the display processing unit 226 along with the message. At a step S39, the display device 227 can display a message indicating the incompleteness of download together with identification of the pertinent terminal 110.

Thus, in the terminals and the online system of the second embodiment, information on the abnormality of data and program can be automatically sent to the host computer 120 depending on the result of check by the check processing unit 303. Thereby people in the operation center can automatically get information regarding the abnormality of the terminals 110.

This removes a hassle from the users of the terminal 110. Also, since accurate and proper information is provided without delay for the people in the operation center, they can take a proper counter measure immediately. For example, a counter measure can be taken to carry out downloading for the pertinent terminals 110 by selecting the pertinent terminals 110 having incomplete data and programs and by executing a download command.

Here, it is possible for the ROM 201 to store error handling programs which not only notify the host computer 120 of an abnormality but also display a message regarding the abnormality on the display device 205 of the terminal 110. Thus, the users of the terminal 110 as well as the people in the operation center can get information regarding the abnormality of data and programs.

Alternately as in the following, the host computer 120 can automatically execute the downloading of data and programs for pertinent terminals 110 in response to a message indicating the abnormality of data and program.

Figure 10A:
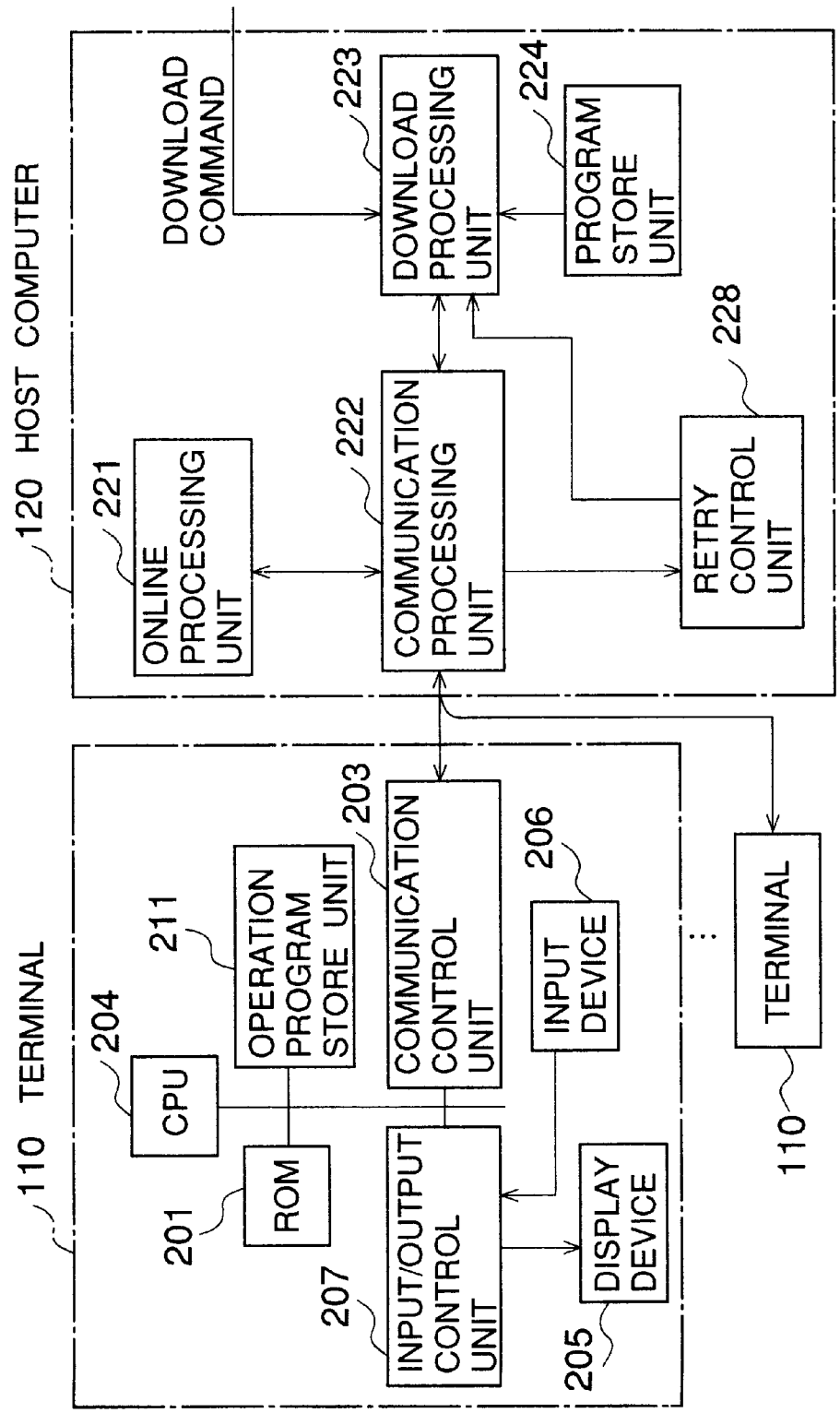

FIG. 10A shows a block diagram of an online system according to the third embodiment of the present invention. FIG. 10B shows a flow chart of a process of the host computer 120.

In FIG. 10A, the host computer 120 of the online system according to the third embodiment has an additional retry control unit 228 in the host computer 120 of FIG. 5. The retry control unit 228 gives an instruction to the download processing unit 223 to restart downloading. In FIG. 10A, the terminals 110 are the same as those of FIG. 8.

FIG. 10B only shows a response of the host computer 120 to a message sent from the terminals 110 which carry out the same procedure shown by the steps S30 through S37 of FIG. 9B. In other words, steps shown in FIG. 10B are a continuation to the step S37 of FIG. 9B, replacing the steps S38 and S39.

The retry control unit 228 receives a message indicative of incomplete downloading from the terminal 110 via the communication processing unit 222 at a step S48, and activates the download processing unit 223 at a step S49.

With the communication processing unit 222 sending an identification along with the message to the retry control unit 228, the retry control unit 228 can identify the pertinent terminal 110 when activating the download processing unit 223. Thus, at a step S50, the host computer 120 can retry the downloading of data and programs on the terminal 110 with incomplete downloading.

As described above, the retry control unit 228 controls the download processing unit 223 and can implement a function of the download unit 121. Thus, when downloading is terminated, the host computer 120 can automatically carry out the downloading of data and programs in response to a message from the terminal 110.

This opparatus removes some work load from the people in the operation center, since they do not have to execute a download command each time when receiving a message indicating the abnormality of data and programs.

Alternately as in the following, the host computer may administer all the terminals by using centralized information on each of the terminals.

Figure 11:
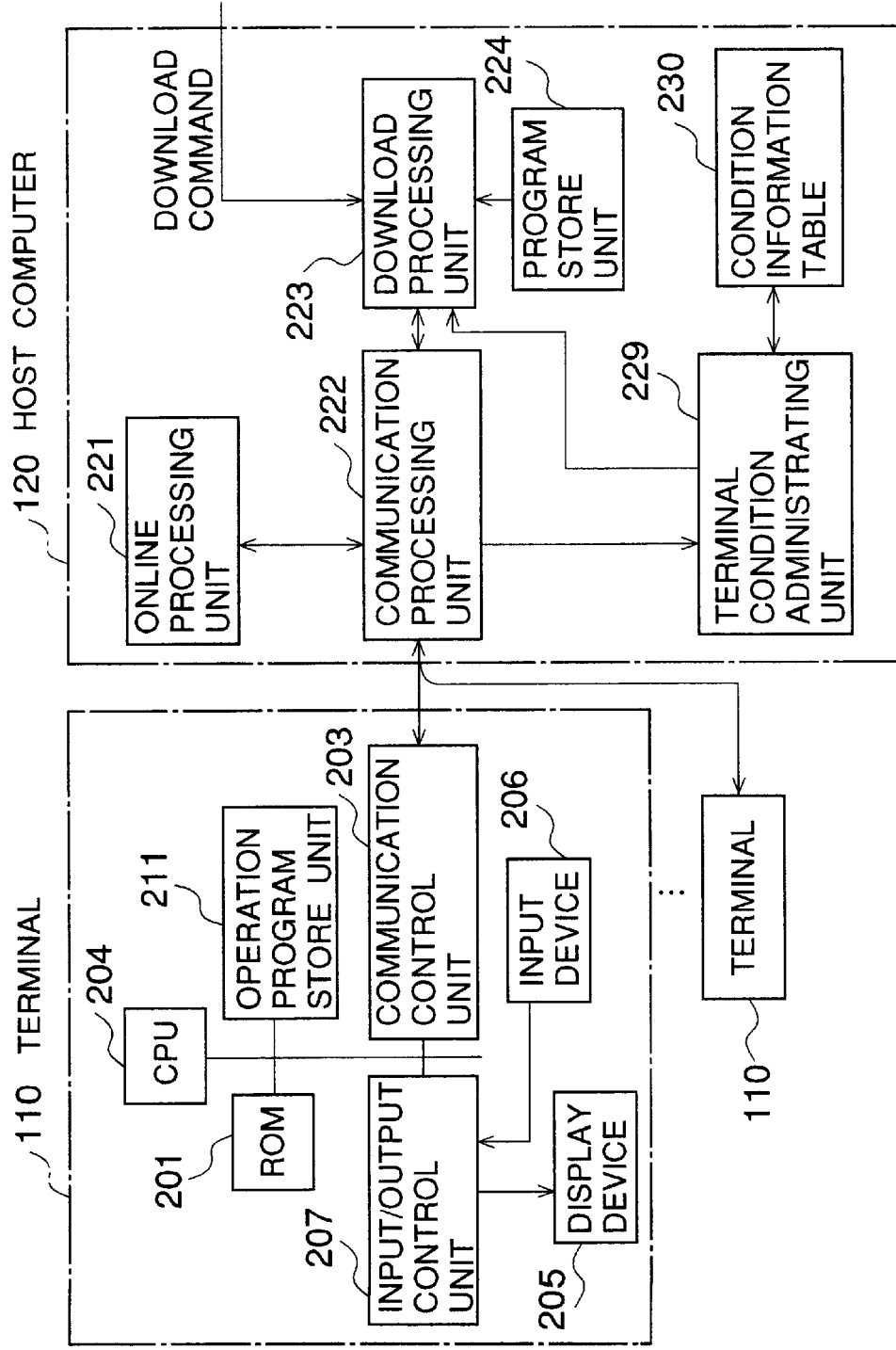
FIG. 11 is a block diagram of terminals and an online system according to the fourth embodiment of the present invention.

FIG. 11 shows a block diagram of terminals and an online system according to the fourth embodiment of the present invention.

In FIG. 11, the host computer 120 of the online system according to the fourth embodiment has a terminal condition administrating unit 229 and a condition information table 230 replacing the retry control unit 228 of the host computer 120 of FIG. 10A. Those two constitute the terminal administrating unit 123. The terminal condition administrating unit 229 receives information on each of the terminals 110 via the communication processing unit 222 so as to store it in the condition information table 230.

Usually, the download processing unit 223 carries out downloading on all the terminals 110 in response to a download command. When taking a counter measure for incomplete downloading, the download processing unit 223 carries out downloading on the pertinent terminals 110 in response to an instruction from the terminal condition administrating unit 229.

In FIG. 11, the ROM 201 of each of the terminals 110 contains, instead of the programs for checking version information and handling errors, programs which read the version information 1 and 2 from the operation program store unit 211 and send it to the host computer 120.

Figure 12A:
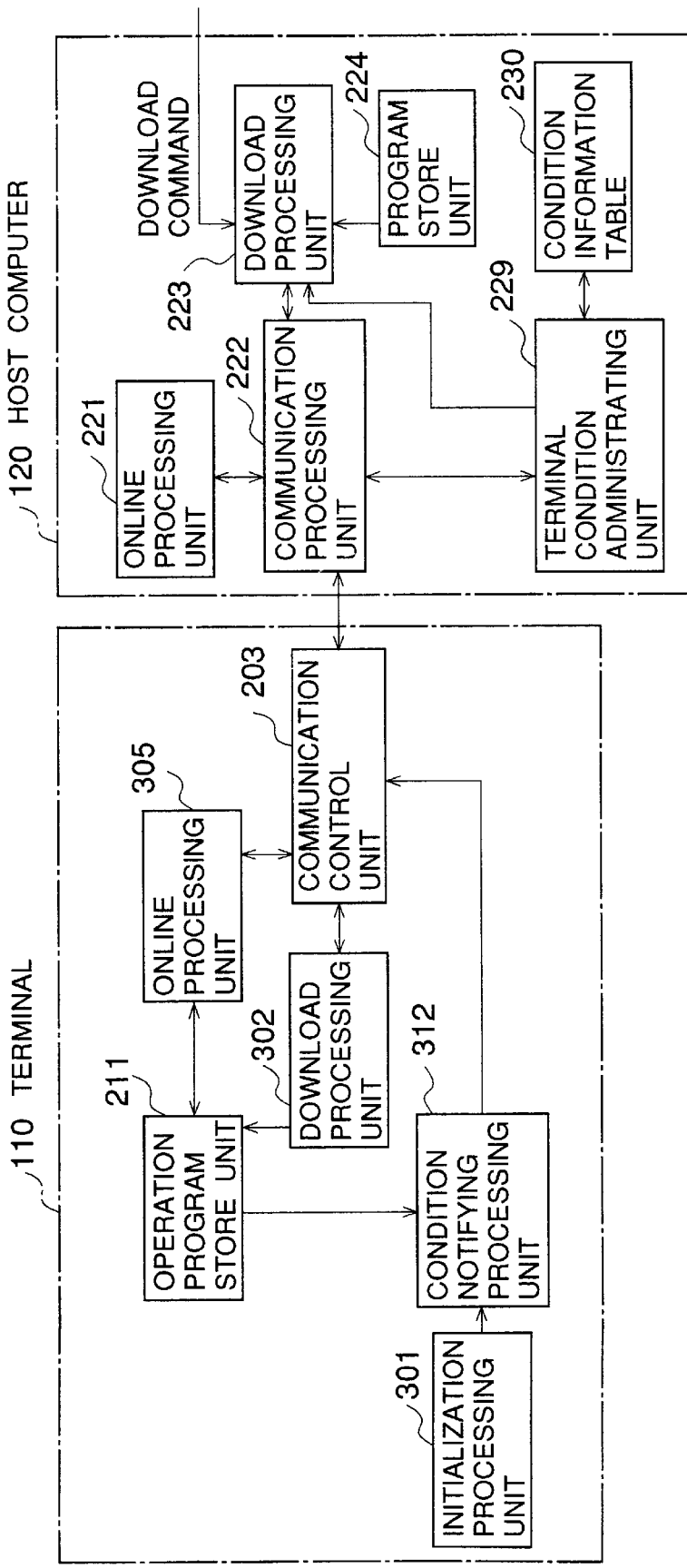
FIGS. 12A and 12B are respectively a block diagram showing functions of the terminals and the online system and a flow chart of them according to the fourth embodiment of the present invention.
Figure 12B:
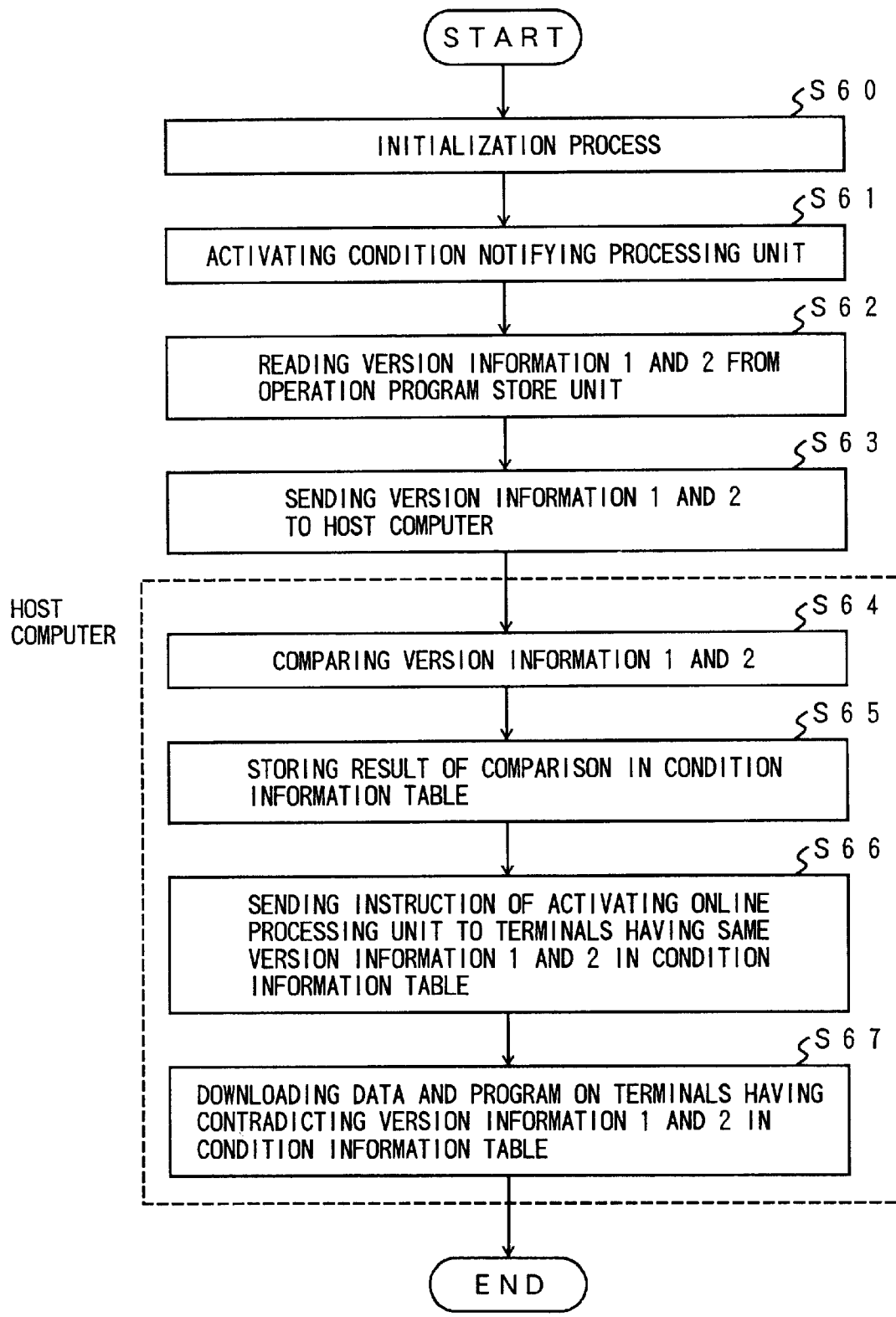

FIG. 12A shows a block diagram for explaining functions of the terminals and the online system according to the fourth embodiment of the present invention. FIG. 12B shows a flow chart of a process of the terminals and the online system.

In FIG. 12A, the terminals 110 have a condition notifying processing unit 312 replacing the check processing unit 303 and the abnormality notifying processing unit 311 of the terminals 110 of FIG. 9A. The condition notifying processing unit 312 is equivalent to the condition notifying unit 117. The condition notifying processing unit 312 represents a function which is carried out by the programs executed by the CPU 204 to send the version information.

In FIG. 12A, elements which have the same corresponding function as those of FIG. 9A are referred to by the same numerals.

The initialization processing unit 301 carries out an initialization process at a step S60, and, then, activates the condition notifying processing unit 312 at a step S61. At a step S62, the condition notifying processing unit 312 reads the version information 1 and 2 from the operation program store unit 211. At a step S63, the condition notifying processing unit 312 sends the version information 1 and 2 to the host computer 120 via the communication control unit 203.

Upon receiving the above information, the terminal condition administrating unit 229 of the host computer 120 starts operating to compare the version information 1 and 2 at a step S64 provided from each of the terminals 110. At a step S65, the result is stored in the condition information table 230 in an entry position corresponding to each of the terminals 110. For example, if the two pieces of the version information is the same, the logical value of 1, indicative of complete data and programs, is stored in the condition information table 230. If the two pieces of the version information are contradictory, the logical value of 0 indicative of the abnormality of data and programs is stored.

At a step S66, the terminal condition administrating unit 229 sends, via the communication processing unit 222, an instruction of activating the online processing unit 305 to the terminals which reported the same version information 1 and 2. Thus, the online processing unit 305 of each of the pertinent terminals 110 is activated.

Then, the terminal condition administrating unit 229 recognizes the identifications of the terminals 110 having contradicting version information in the condition information table 230, and gives to the download processing unit 223 an instruction of downloading on the pertinent terminals 110.

In response to this instruction, the download processing unit 223 informs the pertinent terminals 110 of new downloading, and, then, performs a download process at a step S67 in the same manner as usual.

As described above, the host computer 120 centrally administers all the terminals 110 so as to be able to carry out downloading at one time on the terminals 110 in which a previous download process was terminated. This saves a significant amount of time compared to when downloading one by one on each of the pertinent terminals 110.

Figure 13:
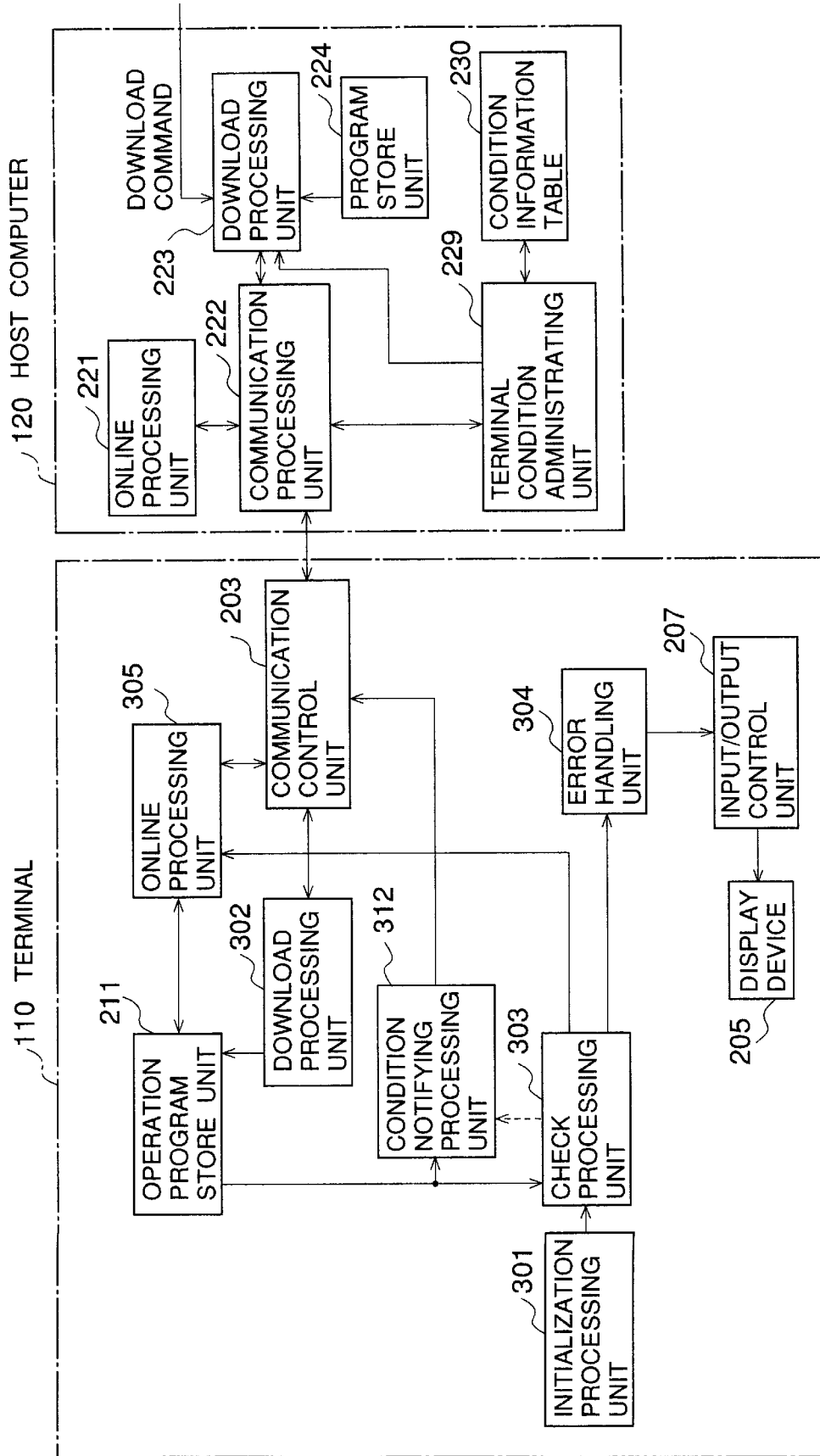
FIG. 13 is a block diagram showing functions of the terminals and the online system according to the fourth embodiment of the present invention.

The ROM 201 may contain, instead of programs which send the version information, programs which correspond to the check processing unit 303 and the error handling unit 304 of FIG. 6A. In this case, the version information is sent to the host computer 120 by the condition notifying processing unit 312, as shown in FIG. 13. At the same time, a check is made on the completeness of the data and the programs by the check processing unit 303, and the online processing unit 305 or the error handling unit 304 is activated depending on the result of the check.

If the data and programs are valid, the online processing unit 305 is activated without waiting for an instruction from the host computer 120 so that the terminals 110 can be made operative faster than otherwise. If the download process is incomplete, the error handling unit 304 is activated to display a message on the display device 205 via the input/output control unit 207 and thereby notifies the users of the problem.

Alternately, programs corresponding to the condition notifying processing unit 312 can be changed to those for sending the result of a check instead of sending the version information.

For example, instead of reading the version information from the operation program store unit 211, the condition notifying processing unit 312 can receive from the check processing unit 303 the result of a check whether the data and the programs are valid. Then, the condition notifying processing unit 312 can generate a message indicating the result of the check, and send the message to the host computer 120 via the communication control unit 203. The operations just described here can be implemented by programs stored in the ROM 201.

As described above, the check processing unit 303 and the condition notifying processing unit 312 can implement the function of the condition notifying unit 117. Thus, those two can send to the host computer 120 the result of a validity check as information regarding the condition of the terminals 110.

In this case, either the online processing unit 305 or the error handling unit 304 is activated depending on the result of a check on data and programs made by the check processing unit 303, so that there is no need for the terminal condition administrating unit 229 of the host computer 120 to activate the online processing unit 305. Thus, what the terminal condition administrating unit 229 has to do is only to activate the download processing unit 223 when there is incomplete downloading. Here, the terminal condition administrating unit 229 holds the result of a check and the identification for each of the terminals 110 in the condition information table 230.

In this case, the check processing unit 303 of each of the terminals 110 and the terminal condition administrating unit 229 of the host computer 120 together perform the function of the terminal administrating unit 123.

As described above, each of the terminals 110 checks the validity of data and programs by comparing the version information, and sends the result of the check to the host computer 120. Thus, work load on the host computer 120 can be reduced, compared to the host computer 120 centrally performing all the necessary tasks.

In the present invention, version information is written into an erasable memory medium at the beginning and end of data and programs. The comparison of the two pieces of version information makes it possible to determine the validity of data and programs with a simple mechanism. Thus, even in the fields which require the miniaturization and low costs of terminals, remote downloading on each terminal can be realized in an online system. This leads to a significant reduction in work load on maintenance workers.

Further, terminals with a function of notifying a host computer of their conditions makes it possible that processes for activating the terminals such as a retry of downloading can be carried out automatically by the online system. Thus, the work load on users of the terminals and people in the operation center can be reduced.

Further, the present invention is not limited to these embodiments, but various variations and modifications may be made without departing from the scope of the present invention.

What is claimed is:

1. A terminal device for carrying out online processing with a host computer by using information stored in a memory, said terminal device comprising;

store control means for receiving the information and version information regarding said information from the host computer and for storing in said memory said information with two copies of said version information attached at a beginning and an end of said information, respectively;

check means for reading and comparing said two copies of said version information stored in said memory with each other;

online processing means for starting the online processing based on said information stored in said memory if said two copies of said version information are identical to each other based upon the comparison of said check means; and display means for displaying a message indicating an abnormality of said information if said two copies of said version information are contradictory to each other based upon the comparison of said check means.

2. The terminal device as claimed in claim 1, wherein said information is data and programs.

3. A terminal device for carrying out online processing with a host computer by using information stored in a memory, said terminal device comprising;

store control means for receiving the information and version information regarding said information from the host computer and for storing in said memory said information with two copies of said version information attached at a beginning and an end of said information, respectively;

check means for reading and comparing said two copies of said version information stored in said memory with each other;

online processing means for starting the online processing based on said information stored in said memory if said two copies of said version information are identical to each other based upon the comparison of said check means; and abnormality notifying means for sending to said host computer a message indicating an abnormality of said information if said two copies of said version information are contradictory to each other based upon the comparison of said check means.

4. The terminal device as claimed in claim 3, wherein said information is data and programs.

5. An online system with at least one terminal device for carrying out online processing with a host computer by using information stored in a memory, said online system comprising;

each of said at least one terminal device including store control means for receiving the information and version information regarding said information from the host computer and for storing in said memory said information with two copies of said version information attached at a beginning and an end of said information, respectively, check means for reading and comparing said two copies of said version information stored in said memory with each other, online processing means for starting the online processing based on said information stored in said memory if said two copies of said version information are identical to each other based upon the comparison by said check means, and abnormality notifying means for sending to said host computer a message indicating an abnormality of said information if said two copies of said version information are contradictory to each other based upon the comparison by said check means; and the host computer including download means for sending said information to said at least one terminal device in response to said message.

6. The online system as claimed in claim 5, wherein said information is data and programs.

7. An online system with at least one terminal device for carrying out online processing with a host computer by using information stored in a memory, said online system comprising;

each of said at least one terminal device including store control means for receiving the information and version information regarding said information from the host computer and for storing in said memory said information with two copies of said version information attached at a beginning and an end of said information, respectively, condition notifying means for generating condition information based on said two copies of said version information stored in said memory and for sending said condition information to the host computer, and online processing means for starting the online processing based on said information stored in said memory in response to a start instruction; and the host computer including download means for sending said information to at least one of said at least one terminal device according to a download instruction, and terminal administrating means for generating said download instruction and said start instruction by using said condition information from said at least one terminal device.

8. The online system as claimed in claim 7, wherein said information is data and programs.

* * * * *